(12) United States Patent
Thomas

(10) Patent No.: US 12,167,826 B2
(45) Date of Patent: *Dec. 17, 2024

(54) AUTONOMOUS VACUUM OPERATION IN RESPONSE TO DIRT DETECTION

(71) Applicant: TECHTRONIC FLOOR CARE TECHNOLOGY LIMITED, Tortola (VG)

(72) Inventor: Kevin L. Thomas, Indian Trail, NC (US)

(73) Assignee: TECHTRONIC FLOOR CARE TECHNOLOGY LIMITED, Tortola (VG)

( * ) Notice: Subject to any disclaimer, the term of this patent is extended or adjusted under 35 U.S.C. 154(b) by 243 days.

This patent is subject to a terminal disclaimer.

(21) Appl. No.: 17/511,184

(22) Filed: Oct. 26, 2021

(65) Prior Publication Data

US 2022/0039623 A1 Feb. 10, 2022

Related U.S. Application Data

(63) Continuation of application No. 16/264,912, filed on Feb. 1, 2019, now Pat. No. 11,154,170.

(Continued)

(51) Int. Cl.
*A47L 9/28* (2006.01)
*B25J 5/00* (2006.01)
(Continued)

(52) U.S. Cl.
CPC .............. *A47L 9/281* (2013.01); *A47L 9/2826* (2013.01); *A47L 9/2847* (2013.01);
(Continued)

(58) Field of Classification Search
CPC ...... A47L 9/281; A47L 9/2826; A47L 9/2847; A47L 9/2852; A47L 9/2894; A47L 2201/022; A47L 2201/04; A47L 2201/06; A47L 9/165; A47L 9/1608; B25J 5/007; B25J 9/1664; B25J 9/1694; B25J 11/0085;
(Continued)

(56) References Cited

U.S. PATENT DOCUMENTS 6,323,570 B1 * 11/2001 Nishimura ............ A47L 9/2857
310/90
6,956,348 B2 * 10/2005 Landry ............... A47L 11/4066
701/28

(Continued)

*Primary Examiner* — Bhavesh V Amin
(74) *Attorney, Agent, or Firm* — Michael Best & Friedrich LLP

(57) ABSTRACT

An automated cleaning device includes a chassis, a controller operably connected to a drive assembly and configured to move the chassis within an area to be cleaned in repeated cleaning cycles, a cleaning unit carried by the chassis, a sensor configured to detect material drawn into the cleaning unit and provide a debris signal corresponding to an amount of material drawn into the cleaning unit, the controller being operably connected to the sensor and configured to generate a high-material indicator in response to the debris signal exceeding a predetermined debris threshold, and determining whether the autonomous cleaner is in a high traffic area when the chassis moves within the area to be cleaned based on locations of high-material indicators.

18 Claims, 10 Drawing Sheets

Related U.S. Application Data

(60) Provisional application No. 62/627,472, filed on Feb. 7, 2018.

(51) Int. Cl.
    *B25J 9/16*         (2006.01)
    *B25J 11/00*       (2006.01)

(52) U.S. Cl.
    CPC .......... *A47L 9/2852* (2013.01); *A47L 9/2894* (2013.01); *B25J 5/007* (2013.01); *B25J 9/1664* (2013.01); *B25J 9/1694* (2013.01); *B25J 11/0085* (2013.01); *A47L 2201/022* (2013.01); *A47L 2201/04* (2013.01); *A47L 2201/06* (2013.01)

(58) Field of Classification Search
    CPC .......... G05D 2201/0215; G05D 1/024; G05D 1/0274
    See application file for complete search history.

(56) References Cited

U.S. PATENT DOCUMENTS

| | | | | |
|---|---|---|---|---|
| 7,288,912 | B2* | 10/2007 | Landry | G05D 1/0242 701/28 |
| 7,459,871 | B2* | 12/2008 | Landry | G05D 1/0242 701/28 |
| 7,861,352 | B2* | 1/2011 | Reindle | A47L 11/24 15/52.1 |
| 7,900,310 | B2 | 3/2011 | Reindle | |
| 8,127,399 | B2* | 3/2012 | Dilger | A47L 9/2826 15/340.1 |
| 8,239,992 | B2* | 8/2012 | Schnittman | B60L 50/52 15/52.1 |
| 8,253,368 | B2* | 8/2012 | Landry | G05D 1/0242 701/28 |
| 8,374,721 | B2* | 2/2013 | Halloran | B60L 15/2036 342/450 |
| 8,378,613 | B2* | 2/2013 | Landry | A47L 9/2889 15/327.5 |
| 8,456,125 | B2* | 6/2013 | Landry | A47L 9/0466 318/587 |
| 8,463,018 | B2* | 6/2013 | Chung | G05D 1/0238 15/340.1 |
| 8,598,829 | B2* | 12/2013 | Landry | A47L 11/4061 318/587 |
| 8,755,591 | B2* | 6/2014 | Chung | G05D 1/0238 15/340.1 |
| 8,838,268 | B2* | 9/2014 | Friedman | A47L 9/2894 700/253 |
| 8,871,030 | B2* | 10/2014 | Chen | G05D 1/0274 15/340.1 |
| 9,055,848 | B2* | 6/2015 | Liu | A47L 9/2842 |
| 9,144,361 | B2* | 9/2015 | Landry | A47L 9/2805 |
| 9,357,893 | B2* | 6/2016 | Lee | G05D 1/0044 |
| 9,591,959 | B2* | 3/2017 | Landry | A47L 9/0466 |
| 9,603,499 | B2* | 3/2017 | Friedman | A47L 9/2894 |
| 9,883,783 | B2* | 2/2018 | Landry | G05D 1/0272 |
| 9,988,781 | B2* | 6/2018 | Pickover | B07C 5/34 |
| 10,123,674 | B2* | 11/2018 | Gordon | A47L 9/2815 |
| 10,182,693 | B2* | 1/2019 | Landry | A47L 11/4066 |
| 10,595,695 | B2* | 3/2020 | Landry | A47L 11/4005 |
| 10,788,836 | B2 | 9/2020 | Ebrahimi Afrouzi | |
| 10,795,377 | B2* | 10/2020 | Afrouzi | B25J 9/1664 |
| 11,154,170 | B2* | 10/2021 | Thomas | G05D 1/0274 |
| 11,470,774 | B2* | 10/2022 | Doughty | A01D 34/78 |
| 11,474,533 | B2* | 10/2022 | Forsberg | A47L 9/2815 |
| 11,507,108 | B1* | 11/2022 | Afrouzi | B25J 9/1633 |
| 11,513,529 | B2* | 11/2022 | Ueda | H02J 7/0048 |
| 11,547,260 | B2* | 1/2023 | Broz | A47L 9/2805 |
| 11,571,100 | B2* | 2/2023 | Kim | A47L 9/2852 |
| 11,835,961 | B1* | 12/2023 | Afrouzi | A47L 9/2852 |
| 2004/0204792 | A1* | 10/2004 | Taylor | A47L 9/2805 700/245 |
| 2005/0162119 | A1* | 7/2005 | Landry | A47L 9/0488 318/580 |
| 2005/0188495 | A1* | 9/2005 | Takenaka | A47L 9/2805 15/340.1 |
| 2005/0218852 | A1* | 10/2005 | Landry | A47L 9/2805 318/580 |
| 2007/0069680 | A1* | 3/2007 | Landry | A47L 9/2894 318/580 |
| 2007/0282484 | A1* | 12/2007 | Chung | G05D 1/0274 700/245 |
| 2008/0150466 | A1* | 6/2008 | Landry | A47L 9/2894 901/1 |
| 2009/0038089 | A1* | 2/2009 | Landry | A47L 11/4011 901/1 |
| 2009/0194137 | A1* | 8/2009 | Friedman | A47L 9/281 701/532 |
| 2010/0049364 | A1* | 2/2010 | Landry | G05D 1/0272 701/26 |
| 2010/0063628 | A1* | 3/2010 | Landry | G05D 1/0272 700/258 |
| 2010/0115716 | A1* | 5/2010 | Landry | A47L 9/2831 901/1 |
| 2012/0085368 | A1* | 4/2012 | Landry | A47L 5/362 134/6 |
| 2012/0246862 | A1* | 10/2012 | Landry | A47L 9/2884 15/49.1 |
| 2013/0274924 | A1* | 10/2013 | Chung | G05D 1/0238 700/259 |
| 2014/0129028 | A1* | 5/2014 | Landry | A47L 9/2831 901/1 |
| 2015/0006016 | A1* | 1/2015 | Friedman | G05D 1/0274 701/26 |
| 2015/0374188 | A1* | 12/2015 | Landry | A47L 9/2831 15/21.1 |
| 2017/0202419 | A1* | 7/2017 | Landry | G05D 1/0242 |
| 2017/0371341 | A1* | 12/2017 | Leinhos | G05D 1/0219 |
| 2018/0080188 | A1* | 3/2018 | Pickover | G01S 19/42 |
| 2018/0199780 | A1* | 7/2018 | Landry | A47L 9/281 |
| 2019/0204851 | A1* | 7/2019 | Afrouzi | A47L 9/0405 |
| 2019/0223674 | A1* | 7/2019 | Landry | A47L 9/2884 |
| 2019/0239709 | A1* | 8/2019 | Thomas | A47L 9/281 |
| 2020/0225673 | A1* | 7/2020 | Ebrahimi Afrouzi | G06N 5/04 |
| 2022/0039623 | A1* | 2/2022 | Thomas | B25J 9/1664 |

\* cited by examiner

AUTONOMOUS VACUUM OPERATION IN RESPONSE TO DIRT DETECTION

CROSS-REFERENCE TO RELATED APPLICATIONS

This application is a continuation of U.S. patent application Ser. No. 16/264,912, filed Feb. 1, 2019, which issued as U.S. Pat. No. 11,154,170 on Oct. 26, 2021, which claims priority to U.S. Provisional Patent Application No. 62/627,472, filed Feb. 7, 2018, the entire contents all which are hereby incorporated by reference herein.

FIELD

The present disclosure relates to a vacuum cleaner. More specifically, the present disclosure relates to a system for detecting dirt, dust, and other debris with an autonomous vacuum cleaner in an area to be cleaned and implementing a responsive cleaning function.

BACKGROUND

Vacuum cleaners generally use air flow and suction to draw dust, dirt, or other debris from a surface. The vacuum cleaner typically draws a combination of air and dust, dirt, or other debris into the cleaner through a floor nozzle. This "dirty air" typically enters a separator in the vacuum that separates the dust, dirt, or debris from the air. A bin or bag collects the separated dust, dirt, or debris separated from the air for later disposal. The resulting "clean air" exits the separator where it is exhausted from the vacuum cleaner. An autonomous vacuum cleaner is a vacuum that is configured to traverse and vacuum an area without requiring a user to operate.

SUMMARY

In one aspect, disclosed is an autonomous cleaner that includes a chassis, a controller operably connected to a drive assembly and configured to move the chassis within an area to be cleaned in repeated cleaning cycles, a cleaning unit carried by the chassis, the controller being operably connected to the cleaning unit and configured to operate the cleaning unit in a first cleaning configuration and a second cleaning configuration, a sensor configured to detect material drawn into the cleaning unit and provide a debris signal corresponding to an amount of material drawn into the cleaning unit, the controller being operably connected to the sensor and configured to generate a high-material indicator in response to the debris signal exceeding a predetermined debris threshold, and an area sensing unit that is configured to map the area, the controller being operably connected to the area sensing unit and configured to determine the location of the autonomous cleaner in the area. The controller includes a memory and an electronic processor, the controller is configured to: store the location of the autonomous cleaner in the area where the high-material indicator was generated in each of a predetermined number of cleaning cycles, store high traffic area attributes based on locations of high-material indicators and configured to determine when the autonomous cleaner enters a high traffic area, and determine whether the autonomous cleaner is in a high traffic area when the chassis moves within the area to be cleaned.

Also disclosed is a method of controlling an autonomous cleaner that includes traveling in an area while performing a cleaning function, generating a map of the area and determining the location of the autonomous cleaner in the area while performing the cleaning function, detecting material drawn into a cleaning unit while performing the cleaning function, generating a high-material indicator in response to a quantity of material drawn into the cleaning unit exceeding a predetermined debris threshold, storing the location of the autonomous cleaner in the area where the high-material indicator was generated in each of a predetermined number of cleaning cycles, analyzing the location of the autonomous cleaner where the high-material indicators were generated in each of the predetermined number of cleaning cycles, identifying a region having the high-material indicators in each of the predetermined number of cleaning cycles as a high traffic area, determining high traffic area attributes based on locations of high-material indicators, and storing the high traffic area attributes based on locations of high-material indicators to facilitate determining when the autonomous cleaner enters the high traffic area.

Other features and aspects of the invention will become apparent by consideration of the following detailed description and accompanying drawings.

Figure 1:
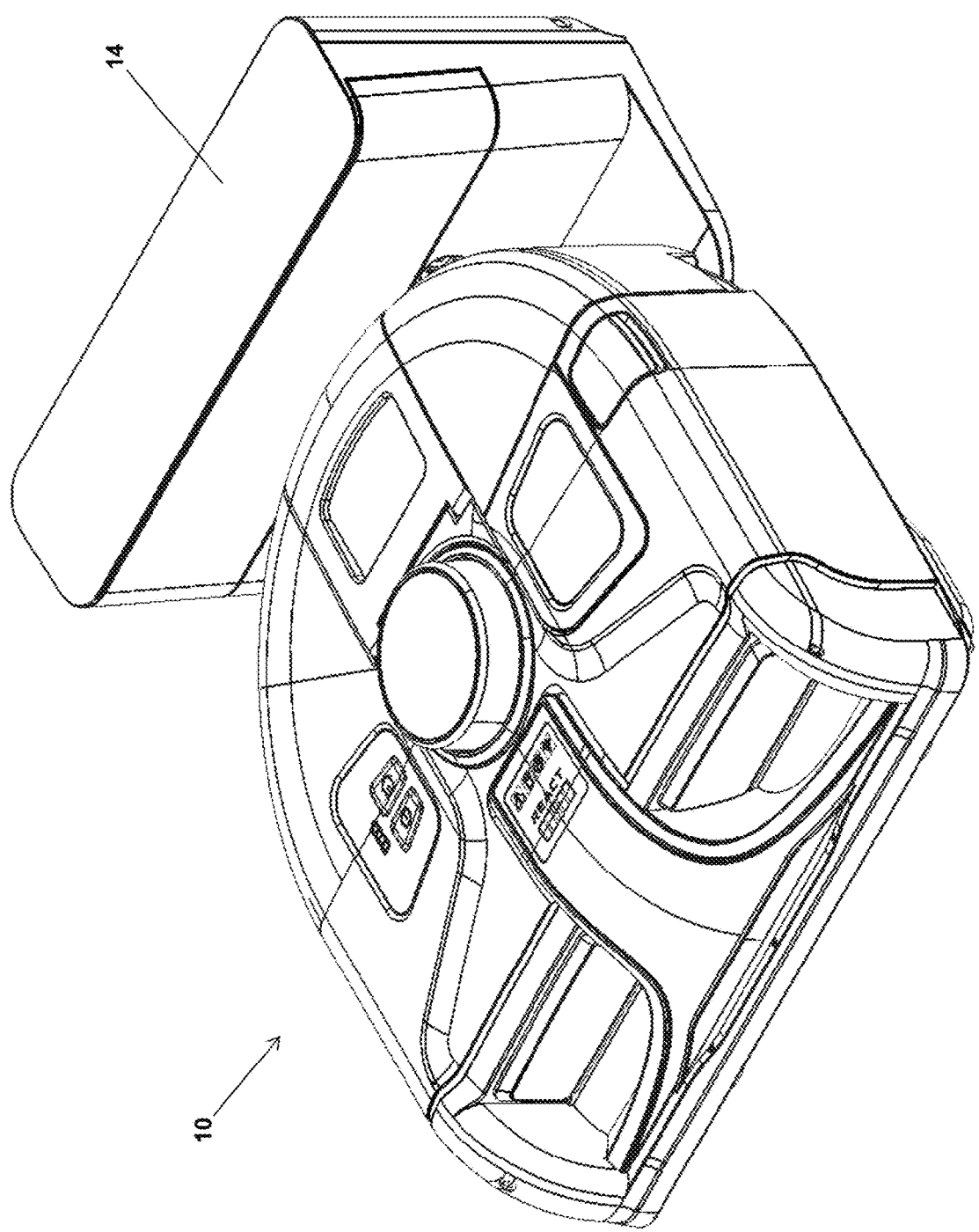
FIG. 1 is a perspective view of an autonomous vacuum cleaner engaged with a charging base in accordance with an embodiment of the invention.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The disclosure and associated figures are generally directed to an autonomous vacuum cleaner 10, and more specifically to a dirt detection system and a control system that can be responsive to dirt detection. The dirt detection system is configured to detect and quantify dirt, dust, particulate, debris, or small objects (collectively, "dirt") encountered by the autonomous vacuum cleaner 10, which is communicated as a dirt detection signal. The control system can utilize the information from the dirt detection system to implement a responsive cleaning configuration (or cleaning mode). Stated another way, the control system can operate in a first cleaning configuration (or normal cleaning mode) in response to the dirt level detected by the dirt detection system being below (or does not exceed) a predetermined level of dirt. Further, the control system can implement a second cleaning configuration (such as a dirty area mode) that intensifies cleaning by the autonomous vacuum cleaner 10 in response to the dirt level detected by the dirt detection system being at or above (or does exceed) a predetermined level of dirt indicating a "dirty" area.

The control system can also combine information from a navigational map used by the autonomous vacuum cleaner 10 to navigate an area to be cleaned with the information from the dirt detection system to generate a map that includes the detected and quantified dirt encountered by the autonomous vacuum cleaner 10. During cleaning, the control system can generate the navigational map of the area to be cleaned based in part on navigation sensors and location information of the autonomous vacuum cleaner 10 within the area to be cleaned. As the autonomous vacuum cleaner 10 cleans the area during a cleaning cycle, the control system can associate information from the dirt detection system with the location of the autonomous vacuum cleaner 10 within the area to generate a map of the level of dirtiness of the area, or aspects of the level of dirtiness encountered during that cleaning cycle, which is stored for later use. This level of dirtiness map can be the navigational map with information or data associated with dirt detection added to the navigational map, or can be generated as a standalone second map or sub-map, or can be a map layer providing information or data associated with dirt detection.

In response to dirt detection signals that are generated and stored over a plurality of subsequent cleaning cycles, the control system can determine high traffic areas. The control system identifies high traffic areas by identifying regions having a "dirty" area in approximately the same location in each of a predetermined number of preceding cleaning cycles. Stated another way, the control system identifies high traffic areas by recognizing a "dirty" area identified in one cleaning cycle proximate to or overlapping a "dirty" area identified in one or more subsequent cleaning cycle, as discussed below. Regions identified as high traffic areas utilize the information from the plurality of previous cleaning cycles to generate a high traffic map. The high traffic map identifies regions in the cleaning area that the controller determines as likely to be high traffic areas based on repeated incidence of elevated measured dirt levels, or high-material indicators, in the identified region. The control system can then communicate the high traffic area or the high traffic map to the user for further treatment. Alternatively, or additionally, the control system can use information from the high traffic map to determine when the autonomous vacuum cleaner enters a high traffic area and automatically take action in the high traffic area during cleaning. For example, the control system can implement an appropriate cleaning configuration (e.g., the dirty area mode, a high traffic mode, etc.) when the autonomous vacuum cleaner 10 enters the high traffic area in a subsequent cleaning cycle.

It should be appreciated that the term "map," as used throughout this disclosure, is not limited to a diagrammatic or schematic, visual depiction of information. A map can be any database or table or collection of data documenting spatial and/or temporal information such as location, date, time, and other associated information such as navigational, dirt detection, high traffic, obstacle, or any other information, whether displayed visually or not displayed visually. For example, the level of dirtiness map can be any systematic collection of data associating dirt detection data with the location in the cleaning area where the dirt collection data was recorded. As another example, the high traffic map can be the navigational map with information or data associated with the high traffic area added to the navigational map, can be generated as a standalone second map or sub-map, or can be a map layer providing information or data associated with the high traffic area. The high traffic map can be any systematic collection of data associating the high traffic area with the location in the cleaning area where the high traffic area was identified.

Referring now to the Figures, FIG. 1 illustrates an embodiment of the autonomous vacuum cleaner 10. The autonomous vacuum cleaner 10 can selectively engage a charging base 14 that can be coupled to a source of electricity (e.g., to a wall outlet by a cord, etc.). In response to the autonomous vacuum cleaner 10 engaging the charging base 14, the charging base 14 can supply electricity to the autonomous vacuum cleaner 10 to recharge one or more batteries (not shown) that power the autonomous vacuum cleaner 10.

Figure 2:
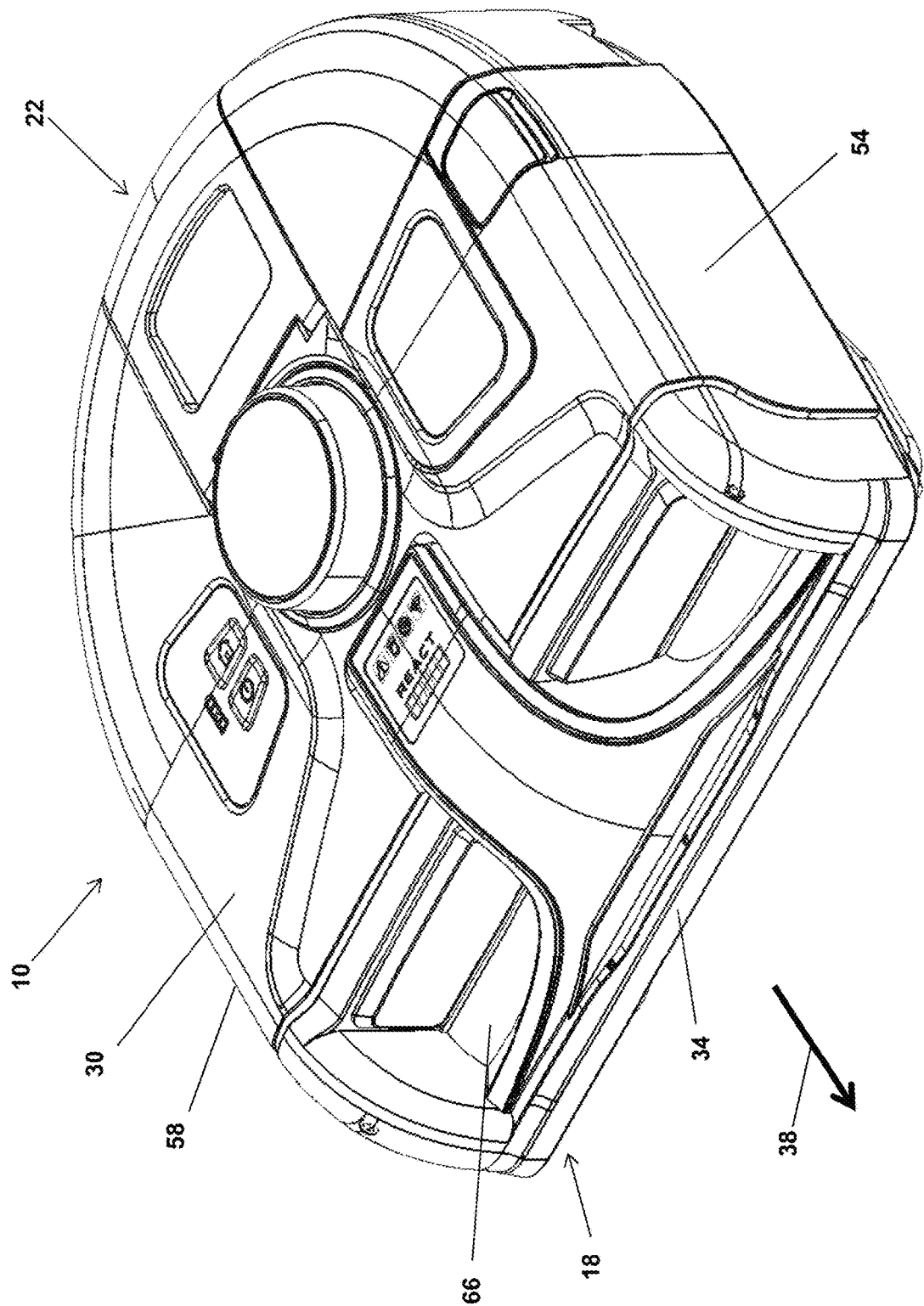
FIG. 2 is a perspective view of the autonomous vacuum cleaner of FIG. 1.
Figure 3:
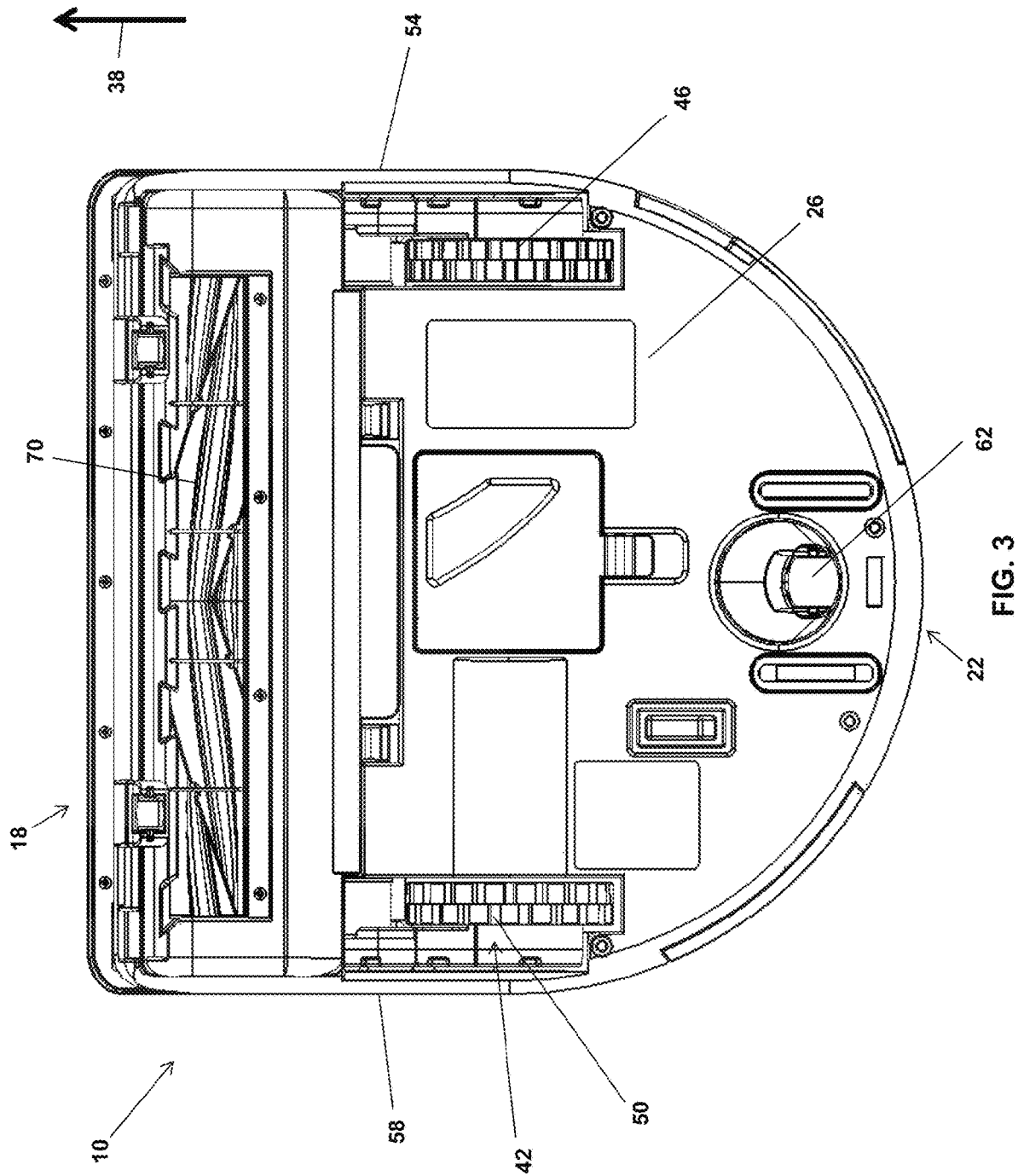
FIG. 3 is a plan view of the bottom of the autonomous vacuum cleaner of FIG. 2.

FIGS. 2-3 illustrate the autonomous vacuum cleaner 10 disengaged from the charging base 14. The autonomous vacuum cleaner 10 includes a front end 18 that is opposite a back end 22. The autonomous vacuum cleaner 10 also includes a chassis 26 (or an undercarriage 26 or a frame 26) (shown in FIG. 3). An outer housing 30 (or outer shell 30) (shown in FIG. 2) cooperates with the chassis 26 to encase one or more components of the autonomous vacuum cleaner 10.

With specific reference to FIG. 2, a front bump sensor 34 is positioned at the front end 18 of the autonomous vacuum cleaner 10. The front bump sensor 34 is provided at a leading edge of the autonomous vacuum cleaner 10 in a direction of forward travel 38. The direction of forward travel 38 generally extends from the back end 22 towards the front end 18. The autonomous vacuum cleaner 10 is also configured to operate in a direction opposite the direction of forward travel 38, or in reverse.

Referring now to FIG. 3, the autonomous vacuum cleaner 10 includes a drive assembly 42. The drive assembly 42 includes a pair of motorized drive wheels 46, 50. A first drive wheel 46 is positioned proximate a first side 54, while a second drive wheel 50 is positioned proximate a second side 58 of the autonomous vacuum cleaner 10. The drive wheels 46, 50 can operate (or rotate) independently of each other. As such, the drive wheels 46, 50 can rotate at the same speed, resulting in the direction of forward travel 38 being generally straight, or can rotate at different speeds to facilitate a turning movement of the autonomous vacuum cleaner 10. The autonomous vacuum cleaner 10 can also include one or more third wheels 62, which can be driven or non-driven (e.g., a caster wheel 62).

Figure 4:
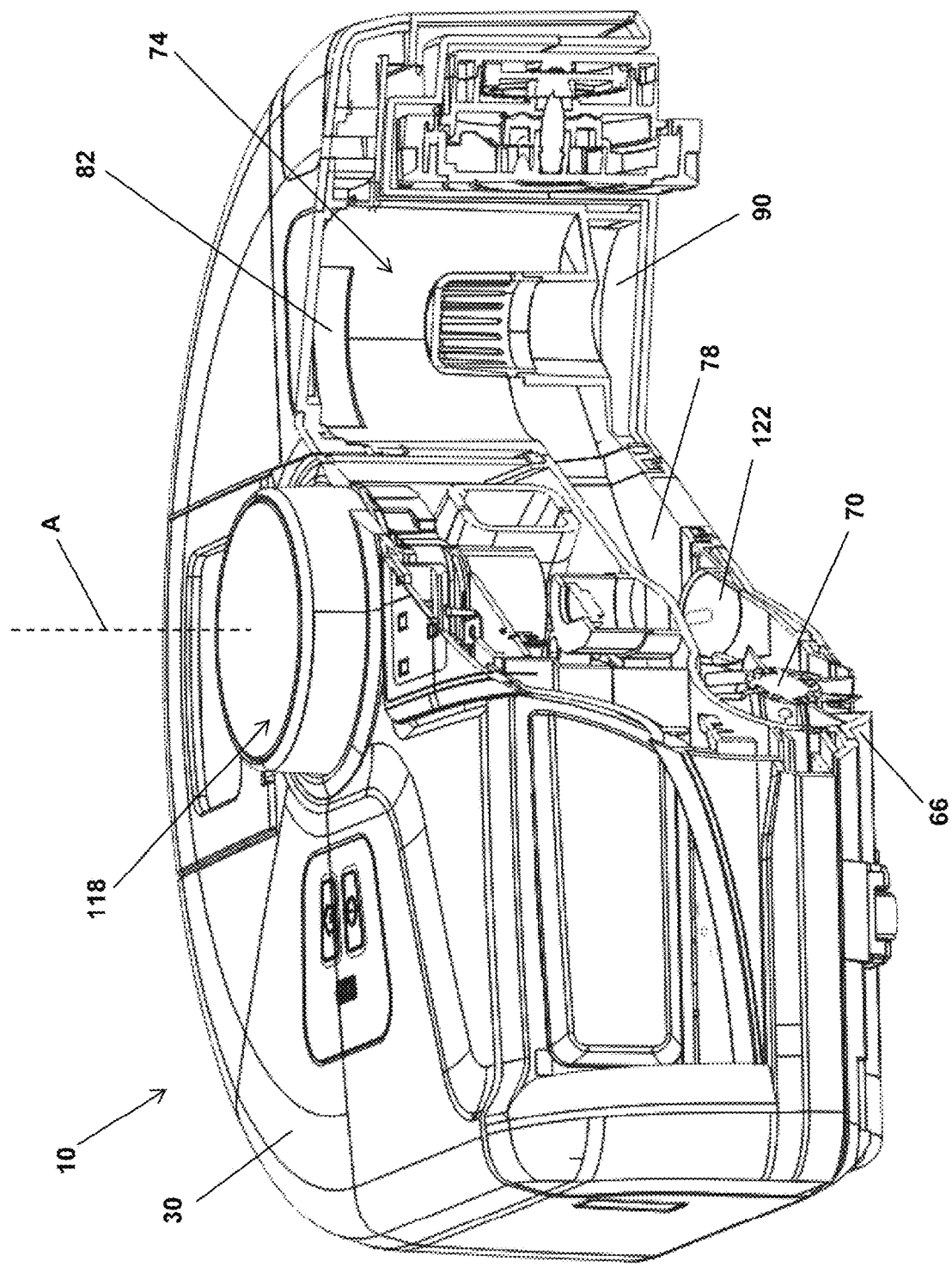
FIG. 4 is a front perspective view of the autonomous vacuum cleaner of FIG. 2 with a portion of an outer housing removed to illustrate a nozzle, a conduit that includes a dirt detection sensor, and a portion of a separator assembly.

The vacuum cleaner includes a nozzle 66 (shown in FIG. 2), and optionally a brush roll 70 (shown in FIGS. 3-4). The brush roll 70 is configured to rotate at least partially within the nozzle 66. To facilitate rotation, the brush roll 70 is operably connected to a brush roll motor (not shown) by a belt (e.g., a geared belt, etc.) (not shown). With reference to FIG. 4, the nozzle 66 is fluidly connected to a dust separator assembly 74 by a conduit 78. In the illustrated embodiment, the separator assembly 74 is a cyclonic separator. In other embodiments, the separator assembly 74 can be any suitable separator assembly (e.g., a bag unit, a filter unit, any suitable non-cyclone separator, etc.).

Figure 5:
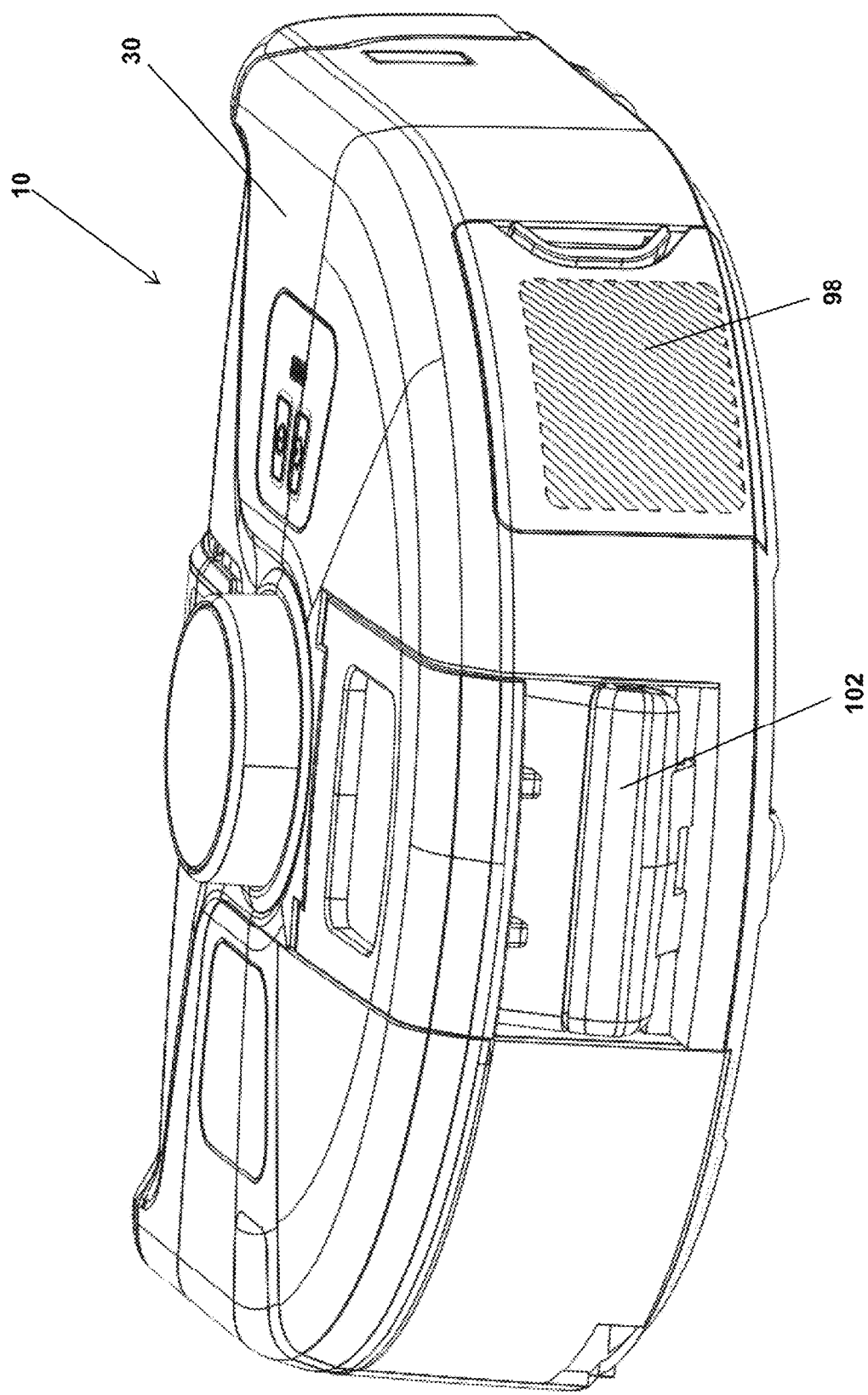
FIG. 5 is a perspective view of the rear of the autonomous vacuum cleaner of FIG. 2.
Figure 6:
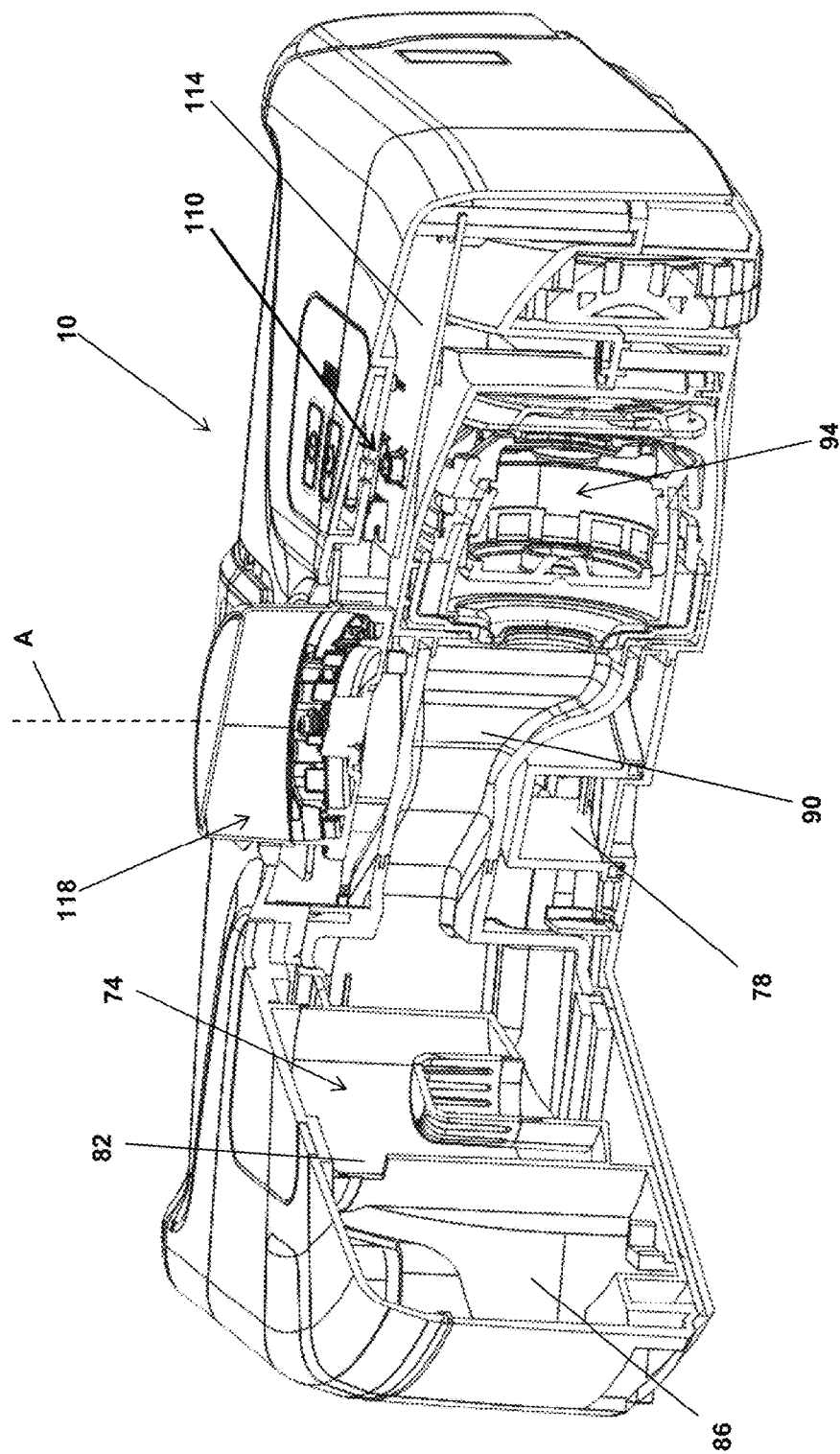
FIG. 6 is a perspective view of the autonomous vacuum cleaner of FIG. 5 with a portion of the outer housing removed to illustrate a portion of the separator assembly, a dust cup, and a suction motor assembly.

With continued reference to FIG. 4, dust that exits the separator assembly 74 through a dust outlet 82 collects in a dust cup 86 (or a dust collection chamber 86 or a dirt cup 86 or a collection bin 86) (shown in FIG. 6). With reference to FIG. 6, cleaned air exits through the separator assembly 74 by a clean air outlet 90, and travels to a suction motor assembly 94, where it is then discharged through a vent 98 (shown in FIG. 5).

The term "cleaning unit" as used herein can collectively include the nozzle 66, the separator assembly 74, the conduit 78, and any associated components that assist with the intake of dirty air, separation of dust from the dirty air, storage of dust, generation of airflow, and/or discharge of air from the separator assembly 74. For example, the cleaning unit can include the brush roll 70, the dust cup 86, the suction motor assembly 94, etc.

Referring to FIG. 5, an energy storage system 102 (or a battery pack 102) is positioned in the autonomous vacuum cleaner 10 to store and provide electricity to operate the autonomous vacuum cleaner 10. The energy storage system 102 can include a plurality of cells or battery cells (not shown). The illustrated energy storage system 102 can be recharged (e.g., at the charging base 14, etc.).

With reference now to FIG. 6, the autonomous vacuum cleaner 10 includes a controller 110. The controller 110 can be provided in association with a printed circuit board 114, is operably connected to the drive assembly 42 (shown in FIG. 3), and is configured to operate the plurality of drive wheels 46, 50 to move the autonomous vacuum cleaner 10 (or the associated chassis 26) within the area to be cleaned. The controller 110 includes a memory (not shown) and an electronic processor (not shown).

The controller 110 is also configured to map the area to be cleaned. For example, the controller 110 can be in communication with an area sensing unit that is configured to map the area to be cleaned. In the embodiment illustrated in FIGS. 4 and 6, the area sensing unit can be a laser distance sensor 118. The laser distance sensor 118 includes a laser emitter (not shown) and a light sensor (not shown). The laser emitter emits a beam (or a light beam or emitted light), and the light sensor detects light from the beam that is reflected by an obstacle (or reflected light). The light sensor outputs a signal to the controller 110 corresponding to a distance to the obstacle. In one example, the laser distance sensor 118 and the controller 110 are configured to calculate a distance to the obstacle by triangulation using the angle of reflected light and the distance between the laser emitter and the light sensor. In other embodiments, other laser rangefinders may be used. The laser distance sensor 118 measures a distance to objects at points around the autonomous vacuum cleaner 10 as the cleaner operates such that the controller 110 can determine the bounds of the map of the area to be cleaned as the autonomous vacuum cleaner 10 moves about the area.

In addition, the autonomous vacuum cleaner 10 can include one or more odometry encoders (not shown) operably connected to the drive wheels 46, 50. The encoders are configured to determine a distance and an estimated direction the autonomous vacuum cleaner 10 travels based on rotation of one or both of the drive wheels 46, 50. The odometry data from the encoders can be combined with the laser distance sensor data from the laser distance sensor 118 by the controller 110 using Simultaneous Localization and Mapping (SLAM) algorithms, or other mapping techniques, to develop the map of the area to be cleaned (or mapped area). The controller 110 can also control the autonomous vacuum cleaner 10 within the mapped area based on where the autonomous vacuum cleaner 10 travels. Further, the controller 110 can track the location (or position) of the autonomous vacuum cleaner 10 within the mapped area based on where the autonomous vacuum cleaner 10 travels.

The autonomous vacuum cleaner 10 includes one or more obstacle detection sensors (not shown) selected from the group of proximity sensors, cliff sensors, bump sensors, or any other sensor that is configured to sense or detect an object as the autonomous vacuum cleaner 10 travels. The controller 110 receives signals from the obstacle detection sensors (not shown) to identify objects (or obstacles) in the area to be cleaned (e.g., a chair, a sofa, an ottoman, etc.). The controller 110 can then incorporate those objects into the map of the area to be cleaned. Obstacle detection sensors can include infrared sensors, ultrasonic sensors, tactile sensors, or other proximity sensors.

The map of the area to be cleaned can also include a starting point of the autonomous vacuum cleaner 10. For example, the controller 110 can identify (or establish) a starting point of the autonomous vacuum cleaner 10 at the beginning of a cleaning cycle, at initiation of operation of the autonomous vacuum cleaner 10, in response to detection of docking with the charging base 14, etc. The starting point can be identified, for example, as a 0, 0 coordinate in the map (based on an X, Y coordinate system). The controller 110 can also utilize this starting point to assist with mapping and tracking the location (or position) of the autonomous vacuum cleaner 10 within the map and/or within the area to be cleaned to generate location data of the autonomous vacuum cleaner 10. In other embodiments, any suitable system for mapping an area to be cleaned (e.g., ultrasonic distance sensor, digital camera image analysis, etc.) and the associated position of the autonomous vacuum cleaner 10 in the area to be cleaned can be used.

The controller 110 is also in operable communication with a dirt detection sensor 122, shown in FIG. 4. The dirt detection sensor 122 can be a sensor that is configured to detect dirt drawn into the cleaning unit. In addition, the dirt detection sensor 122 is configured to quantify an amount of dirt that is drawn into the cleaning unit. The dirt detection system includes at least the controller 110 and the dirt detection sensor 122. In one embodiment, the dirt detection sensor 122 includes one or more piezoelectric sensors 122 or audio sensors 122 (or microphones 122) positioned in the cleaning unit, for example in or near the conduit 78. The dirt detection sensor 122 is configured to detect an impact of dirt drawn into the conduit 78 entering the cleaning unit. In addition, the dirt detection sensor 122 can be positioned on any suitable wall of the conduit 78. In other embodiments, the dirt detection sensor 122 can be positioned at another suitable position in the cleaning unit (e.g., the nozzle 66, etc.). In additional embodiments, the dirt detection sensor 122 can include a combination of at least one microphone 122 and at least one piezoelectric sensor 122.

Figure 7:
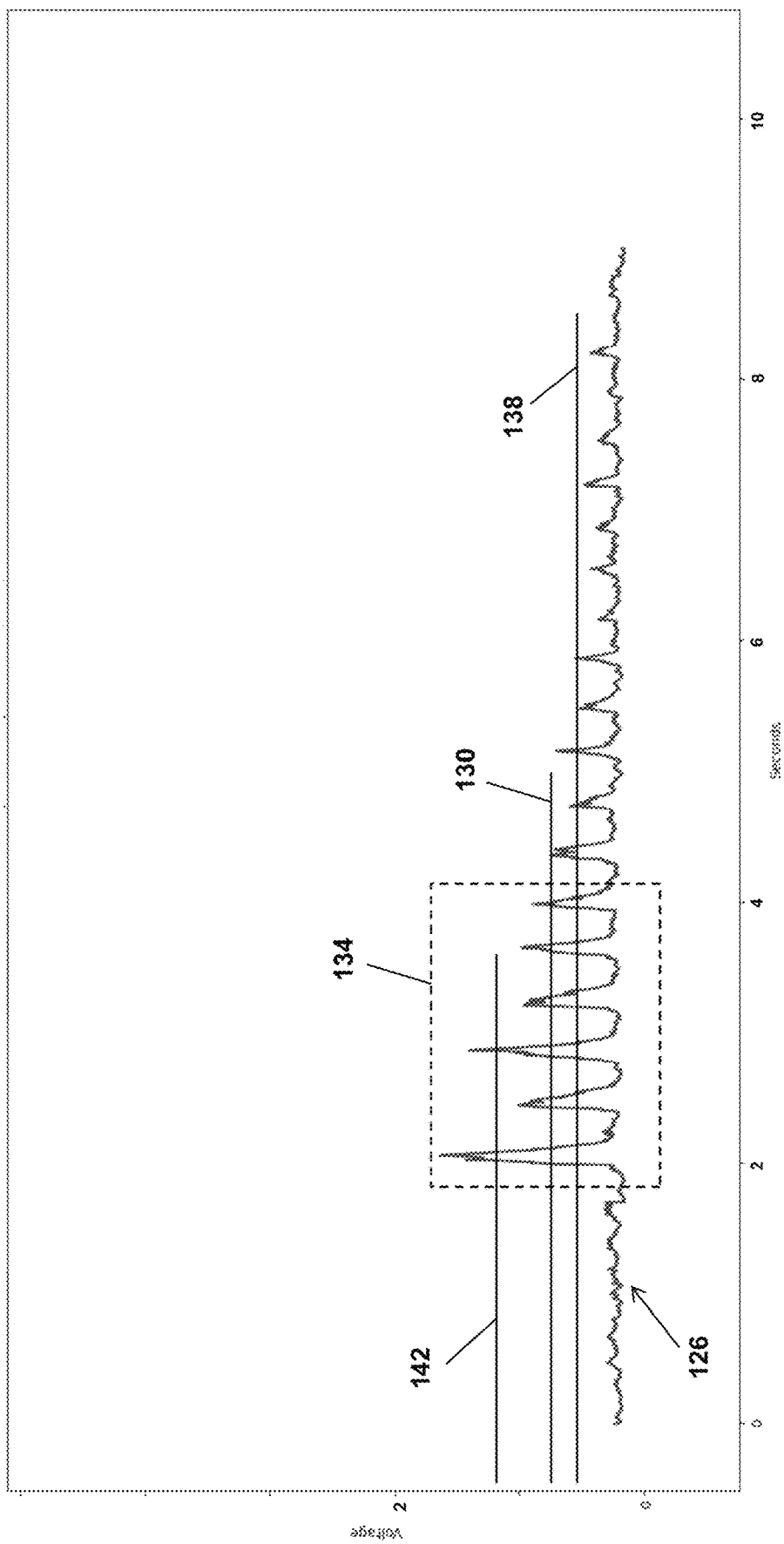
FIG. 7 is a graph that illustrates a debris signal emitted by the dirt detection sensor when encountering dirt.

Upon detection of the dirt by the dirt detection sensor 122, the sensor 122 emits a debris signal 126. A representation of the debris signal 126 that is emitted by the dirt detection sensor 122 is illustrated in FIG. 7. As illustrated, the debris signal 126 is a signal representing a sensor voltage (a voltage signal). In various alternatives, the debris signal 126 can be a voltage signal, a current signal, an audio signal, a light signal, or any other suitable signal output. It should be appreciated that the microphone 122 and the piezoelectric sensor 122 emit substantially the same debris signal. The debris signal 126 illustrated in FIG. 7 is shown with a time reading along the X-axis and a voltage reading along the Y-axis and for a hypothetical sample of dirt. The debris signal can be filtered or further signal-processed to remove noise, such as noise caused by mechanical vibrations produced by operation of the vacuum, the suction motor, the brush roll, and/or other associated mechanical parts. The filtered debris signal can be representative of impacts from dirt entering the cleaning unit.

The controller 110 analyzes the debris signal 126 to quantify an amount of dirt that is detected by the dirt detection sensor 122. In the illustrated embodiment, the controller 110 analyzes the debris signal 126 identifying portions of the debris signal having a magnitude exceeding a predetermined debris threshold 130 in succession over a short period of time, which is indicative of the vacuum cleaner encountering a "dirty" area. As shown in FIG. 7, the portion of the debris signal 126 that exceeds the predetermined debris threshold 130 is identified in broken line box 134 and is representative of the "dirty" area as the portion of the debris signal 126. The remaining portion of the debris signal 126 is a representative debris signal of the autonomous vacuum cleaner 10 encountering a nominal or a typical level of dirt in an area. Stated another way, the level of dirt encountered does not have a magnitude that exceeds the predetermined debris threshold 130 in succession over a short period of time. Upon identifying portions of the debris signal having a magnitude exceeding a predetermined debris threshold 130 in succession over a predetermined period of time, the dirt detection sensor 122 provides a high-material indicator. The controller 110 may look for signal spikes or responses having a magnitude exceeding the predetermined debris threshold 130 in succession over a predetermined period of time to eliminate single events outside of a dirty area from causing a high-material indicator, such as one small rock causing a single, high-magnitude sitmal spike. The controller 110 also associates the location data indicating the location of the autonomous vacuum cleaner 10 in the cleaning area with the identification of the high-material indicator. Further, the controller 110 can optionally associate the amount of dirt that is detected by the dirt detection sensor 122 to identify the location of the high-material indicator within the cleaning area. This combined data can be stored for later use, which is discussed in additional detail below.

The predetermined debris threshold 130 can be determined empirically based on testing of clean or nominally soiled carpets (or surfaces) compared to heavier soil levels and selected to represent a level of dirt that is deemed sufficiently dirty to emphasize. The predetermined threshold 130 can be preprogrammed, or can be programmable (or otherwise able to be changed by a user) as desired. In one embodiment, the threshold can be adjusted to a higher sensitivity threshold 138 that lowers the magnitude of the debris signal registering as a high-material indicator, or a lower sensitivity threshold 142 that raises the magnitude of the debris signal registering as a high-material indicator.

In one embodiment, the controller 110 causes the autonomous vacuum cleaner 10 to change operation upon receiving a high-material indicator. For example, the controller 110 can change operation to a dirty area mode, which can include one or more of slowing down a speed, increasing suction, entering a spot cleaning mode, and/or any other enhanced cleaning actions. The autonomous vacuum cleaner 10 can remain in the dirty area mode until the dirt detection sensor 122 does not provide the high-material indicator, or for a predetermined duration (e.g., a period of time, etc.), or other control as desired.

The controller 110 can log or record the location data indicating the location of the autonomous vacuum cleaner 10 in the cleaning area during the high-material indicator as a level of dirtiness map. Alternatively, the controller 110 can log or record the location data indicating the location of the autonomous vacuum cleaner 10 in the cleaning area in response to the high-material indicator, for example while the cleaner is in dirty area mode, as a level of dirtiness map. Alternatively or additionally, the controller 110 can log location data in response to certain actions as a level of dirtiness map. For example, the level of dirtiness map can include points indicating autonomous vacuum cleaner 10 locations of one or more of where the high-material indicator started, where the high-material indicator ended, locations for a time increment (e.g., each second, half second, etc.) or other duration while the high-material indicator is active, locations the cleaner took action in response to the high-material indicator (e.g., initiated dirty area mode, etc.), and/or locations the cleaner returned to its previous cleaning mode (e.g., terminated dirty area mode, etc.).

Figure 8:
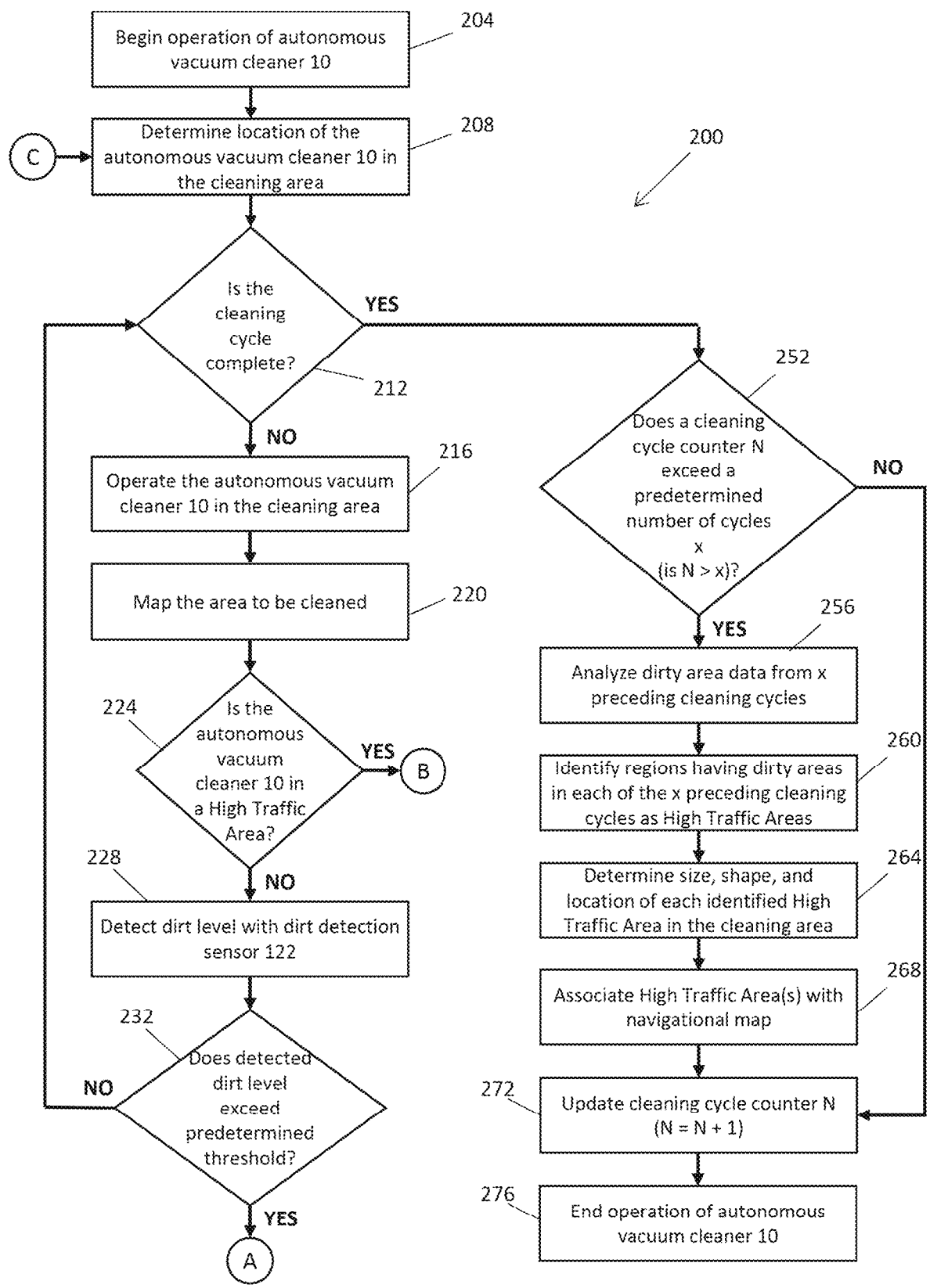
FIG. 8 is a flow diagram of a first portion of a process of operation of the autonomous vacuum cleaner of FIG. 1.
Figure 9:
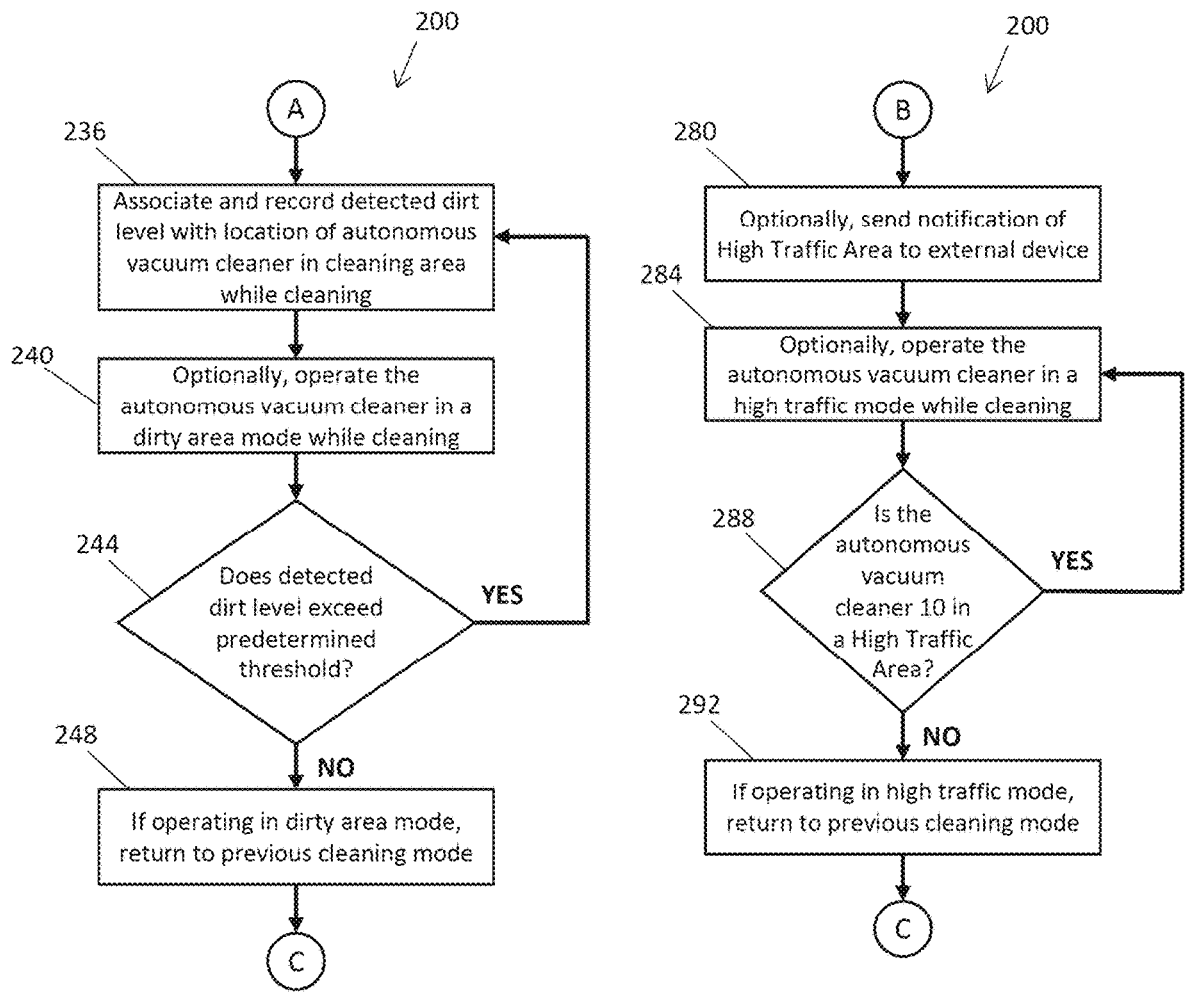
FIG. 9 is a flow diagram of a second portion of the process of operation of the autonomous vacuum cleaner of FIG. 1.

FIGS. 8-9 illustrate an example of a control system or application 200 that uses information acquired from the dirt detection sensor 122 to identify a high traffic area, and optionally implement a cleaning configuration (or cleaning mode) for operation in the high traffic area. The control system 200 includes an operational system where the autonomous vacuum cleaner 10 detects dirt through the dirt detection sensor 122 during operation and determines high traffic areas in response to the repeated detected level of dirt exceeding a threshold in a region in one or more subsequent cleaning cycles. In addition, the operational system can map the area to be cleaned, track the location of the autonomous vacuum cleaner 10 within the area to be cleaned, and correlate the location of the autonomous vacuum cleaner 10 in the cleaning area with detected levels of dirt or aspects of the level of dirtiness encountered during that cleaning cycle to generate the level of dirtiness map of the area, which is stored for later use.

The control system 200 can be a module that operates on (or is associated with) the controller 110. The control system 200 can be distributed and stored on the controller 110, and in certain embodiments is accessible for at least partial execution from a remote location, such as through a mobile phone application, web portal, web site, or generally over the Internet. The control system 200 includes a series of processing instructions or steps that are depicted in flow diagram form.

Referring to FIG. 8, the process begins at step 204, where the autonomous vacuum cleaner 10 is powered on and in an operational state (e.g., the cleaning unit/suction motor assembly 94 are operational, the brush roll 70 is rotating, etc.). In addition, the autonomous vacuum cleaner 10 will be operating in a first cleaning configuration. The first cleaning configuration is a default or normal level of operation with relation to operation speed or velocity of the autonomous vacuum cleaner 10, speed or power of the suction motor assembly 94, speed or power of the brush roll 70, and direction of travel (e straight, a back and forth pattern in the area to be cleaned, etc.).

At step 208, the process determines the location of the autonomous vacuum cleaner 10 in the area to be cleaned. For example, the controller 110 can utilize the area sensing unit, odometry encoders, obstacle detection sensors, and/or a starting point of the autonomous vacuum cleaner 10 to establish the location of the autonomous vacuum cleaner 10 in the area to be cleaned.

Next, at step 212, the autonomous vacuum cleaner 10 continues to operate in the first cleaning configuration and the process determines whether the cleaning cycle is complete. The cleaning cycle is generally complete when the autonomous vacuum cleaner 10 completes cleaning of the area to be cleaned. In other embodiments, the cleaning cycle can be complete once the autonomous vacuum cleaner 10 determines it needs to return to the charging base 14 (e.g., due to a low battery level of the battery pack 102, etc.) or for any other suitable operational reason (e.g., the dust cup 86 is full, etc.). If the process determines that the cleaning cycle is not complete or "no," the process continues to step 216. If the process determines that the cleaning cycle is complete, or "yes," the process proceeds to step 252, discussed below.

At step 216, the process operates the autonomous vacuum cleaner 10 in the area to be cleaned. The controller 110 can provide instructions to the drive assembly 48 to operate the drive wheels 50, 54 and move the autonomous vacuum cleaner 10. The controller 110 can also utilize the area sensing unit and/or obstacle detection sensors to detect obstacles, and initiate a responsive movement of the autonomous vacuum cleaner 10 to avoid the detected obstacle (e.g., change direction of movement from a linear direction to avoid an obstacle, etc.).

At step 220, the process maps the area to be cleaned. During mapping, the controller 110 can utilize the area sensing unit, odometry encoders, obstacle detection sensors, and/or the starting point of the autonomous vacuum cleaner 10 to identify the boundaries of the area to be cleaned, objects and/or obstacles positioned in the area to be cleaned, and the location of the autonomous vacuum cleaner 10 in the cleaning area as it travels through the area to be cleaned.

At step 224, the controller 110 determines whether the autonomous vacuum cleaner 10 is in a high traffic area. More specifically, the controller 110 analyzes the location of the autonomous vacuum cleaner 10 in the cleaning area to ascertain whether the autonomous vacuum cleaner 10 is in a high traffic area. If the autonomous vacuum cleaner 10 is in a high traffic area, or "yes" in step 224, the controller 110 may take additional action, which is discussed in additional detail below. If the autonomous vacuum cleaner 10 is not in a high traffic area, or "no" in step 224, the autonomous vacuum cleaner 10 continues to operate in its mode of operation.

As the autonomous vacuum cleaner 10 moves through and maps the area to be cleaned, the autonomous vacuum cleaner 10 is vacuuming dirt. At step 228, the process detects dirt encountered by the dirt detection sensor 122. For example, the dirt detection sensor 122 can emit the debris signal that corresponds with an amount of dirt drawn into the cleaning unit. The controller 110 can communicate with the dirt detection sensor 122, and can employ one or more algorithms and/or filters to the debris signal to quantify the magnitude of the debris signal from the dirt detection sensor 122.

Next, at step 232, the process analyzes the dirt level detected by the dirt detection sensor 122 to determine whether the detected dirt level exceeds a predetermined debris threshold. More specifically, the controller 110 can analyze the debris signal for portions of the debris signal having an amplitude or magnitude exceeding a predetermined threshold 130 in succession over a predetermined period of time. Alternatively or additionally, the controller 110 can analyze the debris signal for an average magnitude over a predetermined period of time exceeding a predetermined threshold 130. If the detected dirt level does not exceed the predetermined dirtiness level, or "no" in step 232, the autonomous vacuum cleaner 10 continues to operate in the first cleaning configuration and the process returns to step 212. In addition, in response to the debris signal not exceeding the predetermined debris threshold at step 232, the controller 110 does not emit a high-material indicator. If the detected dirt level does exceed the predetermined dirtiness level, or "yes" in step 232, the controller 110 emits a high-material indicator and the process proceeds to step 236 (shown in FIG. 9) where the process associates the high-material indicator with the location of the cleaner.

In one embodiment, the controller 110 can be used to determine the relative amount or level of dirt that is detected by the dirt detection sensor 122. As a non-limiting example, different signal thresholds can be developed for different dirt levels detected by the dirt detection sensor 122, such as the low-dirt threshold 142, the medium-dirt threshold 130, and the high-dirt threshold 138, or similarly assigned a range of values, such as from zero (0) to ten (10), and more specifically from zero (0) to five (5). The detected dirt level is then analyzed in view of the predetermined range of dirtiness level, whereby the controller 110 develops the level of dirtiness map using a range of dirt level thresholds and associating the location of the autonomous vacuum cleaner 10 to the relative level of dirtiness. In this embodiment, the controller 110 can quantify the relative amount of dirt encountered by the dirt detection sensor 122, such as an amount the detected dirt level exceeds the predetermined threshold and associate the quantified amount of dirt with the location of the cleaner in the cleaning area.

With reference to FIG. 9, at step 236, the process associates the high-material indicator with the location of the autonomous vacuum cleaner 10 in the area to be cleaned forming the level of dirtiness map, and optionally, associates the relative or quantified amount of dirt with the location of the autonomous vacuum cleaner 10 in the area to be cleaned when receiving the high-material indicator. This high-material indicator location data is then stored for later use, as discussed further below.

Upon exceeding the predetermined threshold in step 232 and associating location information of the autonomous vacuum cleaner 10 in step 236, the process optionally initiates operation (or implements) the second cleaning configuration, or dirty area mode, in step 240. The second cleaning configuration includes an action to enhance cleaning functionality, such as one or more of reducing the speed or velocity of the autonomous vacuum cleaner 10, increasing a rotational speed of the brush roll 70, increasing a rotational speed of the motor of the suction motor assembly 94 generating additional suction, and implementing a desired movement pattern (e.g., a spot coverage mode wherein the autonomous vacuum cleaner 10 travels in a circle, spiral, zig-zag, back-and-forth, or other pattern, etc.). For example, in one embodiment, the second cleaning configuration includes only slowing down the speed (or velocity) of the autonomous vacuum cleaner 10 by the controller 110 instructing the drive assembly 48 to operate the drive wheels 50, 54 at a slower rotational speed.

Next, at step 244, the process analyzes the dirt level detected by the dirt detection sensor 122 to determine if it continues to exceed the predetermined threshold as discussed with step 232. If the detected dirt level continues to exceed the predetermined dirtiness level, or "yes" in step 244, the autonomous vacuum cleaner 10 continues to operate with the high-material indicator, returning to step 236. If the detected dirt level does not exceed the predetermined threshold, or "no" in step 244, the process proceeds to step 248. At step 248, if the autonomous vacuum cleaner 10 was operating in the second cleaning configuration (e.g. the dirty area mode, etc.), the autonomous vacuum cleaner 10 returns to operate in its previous cleaning mode, such as the first cleaning configuration, and returns to step 208 (shown in FIG. 8), as discussed above.

Returning to step 212 on FIG. 8, when the process determines that the cleaning cycle is complete, or "yes" at step 212, the process proceeds to step 252. At step 252, the process determines whether a cleaning cycle counter N exceeds a number of cleaning cycles X. The cleaning cycle counter N has to exceed a predetermined number of cleaning cycles X before the controller 110 can identify a high traffic area. This allows for the collection of relative dirt levels or high-material indicators in the area to be cleaned and further associating locations of high-material indicators in the area to be cleaned. The cleaning cycle counter N is an integer representative of a number of cleaning cycles performed by the autonomous vacuum cleaner 10 in an area to be cleaned. The cleaning cycle counter N is updated at the completion of each cleaning cycle. It should be appreciated that the cleaning cycle counter N can be periodically reset, for example, manually reset by a user (e.g., actuation of a reset button, etc.) or can automatically reset after a certain event (e.g., the controller determines that the autonomous vacuum is in a different cleaning area, etc.). The number of cleaning cycles X is an integer representative of a number of subsequent cleaning cycles completed used to identify the high traffic area. The number of cleaning cycles X can be a predetermined (or preprogrammed) number. In one embodiment, the number of cleaning cycles X is three (3), meaning the autonomous vacuum cleaner 10 has to perform four (4) complete cleaning cycles before the controller can identify a high traffic areas. In other embodiments, the number of cleaning cycles X can be any integer from two (2) to ten (10) or more. The number of cleaning cycles X can be preprogrammed, or can be programmable (or otherwise able to be changed by a user). If the process determines that the cleaning cycle counter N does exceed the number of cleaning cycles X, or "yes" in step 252, the process proceeds to step 256 to analyze the level of dirtiness maps to identify high traffic areas.

At step 256, the process accesses the saved level of dirtiness maps of the area (i.e., the maps saved at step 236) for a predetermined number (X) of preceding cleaning cycles. In one embodiment, the accessed maps are for the immediately preceding predetermined number (X) of sequential cleaning cycles. In another embodiment, the accessed maps are for a predetermined number (X) of previous cleaning cycles randomly or systematically selected from a number of preceding cleaning cycles greater than X, for one example if X=3, 3 cycles being selected from the preceding 6 cycles. In yet another embodiment, the accessed maps are for a predetermined number (X) of cleaning cycles randomly or systematically selected from a prior duration, for one example selected over the preceding one week period. The controller 110 analyzes the location of high-material indicators in the level of dirtiness maps from the selected cleaning cycles. Stated another way, the process analyzes the location of the device where the high-material indicators were generated in each of the predetermined number (X) of cleaning cycles. Optionally, the controller 110 transmits the selected level of dirtiness maps for preceding cleaning cycles to an external device, such as an remote server, computer, mobile phone, or other external device, whereby the external device analyzes the level of dirtiness maps (e.g., on a mobile phone application, web portal, web site, or generally over the Internet, etc.).

Figure 10:
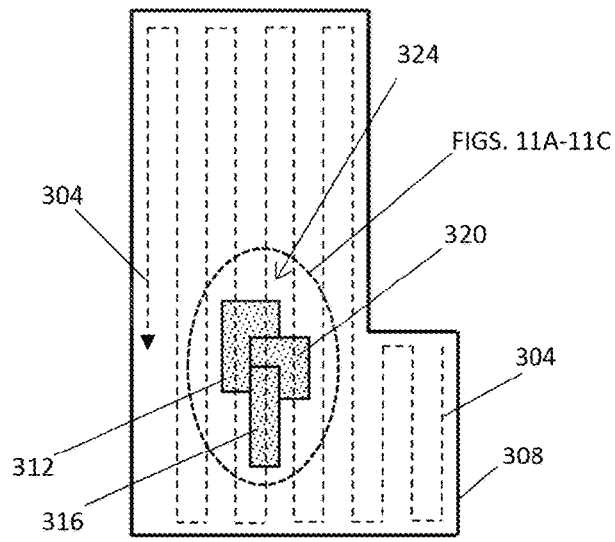
FIG. 10 is a schematic diagram of a plurality of high-material indicator areas in a cleaning area.

Next, at step 260, the process identifies regions in the cleaning area on the level of dirtiness maps having high-material indicators, or dirty areas, in approximately the same location in each of the predetermined number (X) of selected cleaning cycles. Stated another way, the process identifies a region having a high-material indicator in each of the predetermined number (X) of cleaning cycles as a high traffic area. An example where the predetermined number (X) of cleaning cycles is three (X=3) is schematically illustrated in FIG. 10. With reference to FIG. 10, a path 304 of the autonomous vacuum cleaner 10 is illustrated in a schematic outline of a cleaning area 308. For purpose of example, the predetermined number (in this example X=3) of level of dirtiness area maps are combined or overlaid together such that three areas of high-material indicator are shown on the same map. An illustrative first high-material indicator area 312 from a cleaning cycle, for example N, is recorded in the cleaning area. An illustrative second high-material indicator area 316 from a cleaning cycle, for example N+1, is recorded in the cleaning area. An illustrative third high-material indicator area 320 from a cleaning cycle, for example N+2, is recorded in the cleaning area. In this example, the process identifies the first, second, and third high-material indicator areas 312, 316, 320, as correlating to a high traffic area 324 because the "dirty" areas identified in each cleaning cycle N, N+1, and N+2 are proximate to or overlapping a "dirty" area identified in each of the other of cleaning cycles cleaning cycle N, N+1, and N+2.

Figures 11A, 11B, 11C:
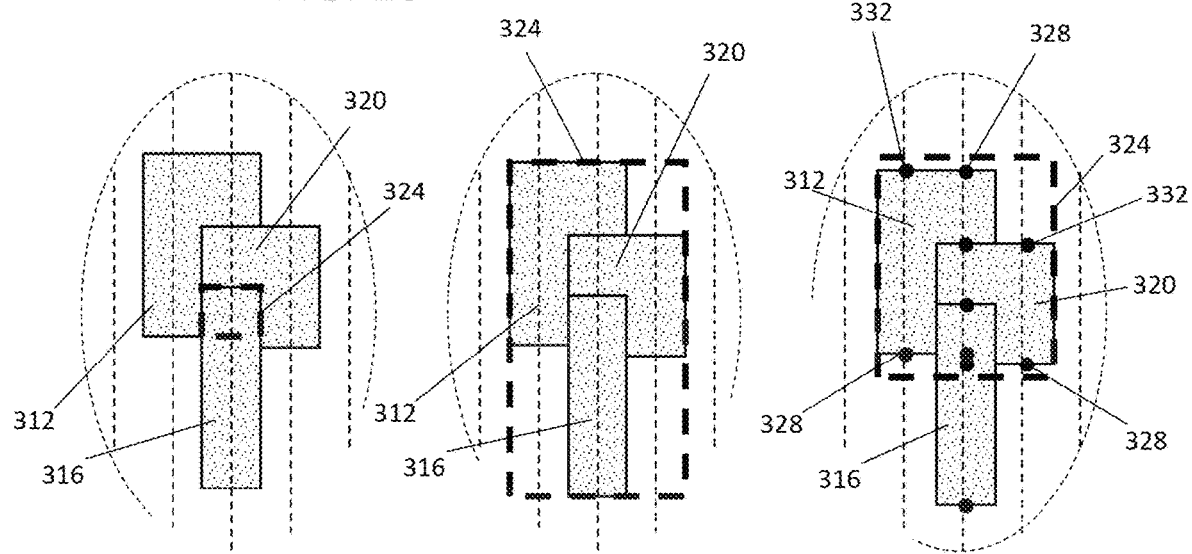
FIGS. 11A, 11B, and 11C are schematic diagrams of FIG. 10 illustrating different processes for identifying high traffic areas used to form a high traffic map.

Returning back to FIG. 8, at step 264, the process determines the size, shape, and location of each identified high traffic area 324 forming the high traffic map. In one embodiment schematically illustrated in FIG. 11A, the high traffic area 324 is sized and positioned to cover an overlap region formed by the area where the first, second, and third high-material indicator areas 312, 316, 320 overlap. In another embodiment schematically illustrated in FIG. 11B, the high traffic area 324 is formed by a rectangular area or area of any other desired shape sized and positioned to include the first, second, and third high-material indicator areas 312, 316, 320. In yet another embodiment schematically illustrated in FIG. 11C, the high traffic area 324 is formed by a rectangle or any other desired shape sized and positioned to include a cluster of points correlated to the first, second, and third high-material indicator areas 312, 316, 320. The points can include one or more points where the high-material indicator started (e.g. point 328), points where the high-material indicator ended (e.g. point 332), points identifying the cleaner location at each second or half second or other duration while the high-material indicator is active, points where the cleaner took action in response to the high-material indicator, and points where the cleaner returned to its previous cleaning mode. In such an embodiment as in FIG. 11C, the high traffic area 324 can be determined by a density of points in a region, or linear distance between points, or other cluster analysis.

Returning back to FIG. 8, next at step 268, the high traffic map determined in step 264 is associated with the navigational map to be accessible to the control system 200. The control system 200 is configured to use high traffic area spatial or topographical attributes from the high traffic map, such as size, shape, and location of each high traffic area 324 in the cleaning area 308, to determine when the autonomous vacuum cleaner 10 enters a high traffic area 324, which is stored in memory (not shown) for subsequent cleaning cycles. Stated another way, the controller 110 stores the high traffic area attributes configured to determine when the autonomous vacuum cleaner enters a high traffic area. In one embodiment, the controller 110 transmits the selected level of dirtiness maps for preceding cleaning cycles to an external device for execution of steps 256, 260, and 264, whereby the external device transmits the high traffic area map to the controller 110 to process step 268. It should be appreciated that the determination of high traffic areas in steps 252-268 is analyzed at the end of a cleaning cycle. In one embodiment, the determination of high traffic areas in steps 252-268 can be performed at the beginning of the cleaning cycle. In another embodiment, the determination of high traffic areas in steps 252-268 can be performed independently of the cleaning cycle, such as on an external device. In yet another embodiment, the determination of high traffic areas in steps 252-268 is performed concurrently with or during a cleaning cycle.

Next, the process proceeds to step 272 where the cleaning cycle counter N is updated by N=N+1. Stated another way, the controller 110 can increase the cleaning cycle counter N by one (1) unit, or in any suitable manner in order to count a minimum number of cleaning cycles.

Next at step 276, the process terminates operation of the autonomous vacuum cleaner 10. Termination of operation can include returning the autonomous vacuum cleaner 10 to the charging base 14 and powering down all components (e.g., the cleaning unit is turned off, etc.).

Returning back to step 252, if the process determines that the cleaning cycle counter N does not exceed the number of cleaning cycles X, or "no" in step 252, the process bypasses the determination of high traffic areas in steps 252-268, and proceeds to update the cleaning cycle counter N in step 272. Once the cleaning cycle counter N is updated, the process ends operation of the autonomous vacuum cleaner 10 in step 276.

With continued reference to FIG. 8, and returning to operation of the autonomous vacuum cleaner in steps 216 and 220, such as in a subsequent cleaning cycle, the process determines whether it is in a high traffic area 324 (shown in FIGS. 10-11C) using the stored high traffic map. At step 224, as discussed above, the controller 110 determines from the location of the autonomous vacuum cleaner 10 in the cleaning area whether the autonomous vacuum cleaner 10 is in a high traffic area 324. If the autonomous vacuum cleaner 10 is in a high traffic area 324, or "yes" in step 224, the process moves to step 280 as shown in FIG. 9.

With reference now to FIG. 9, at step 280 the process optionally can communicate a notification to a user identifying the high traffic area 324 for further treatment as desired by the user.

Next, at step 284, in one embodiment the autonomous vacuum cleaner 10 operates in the second cleaning configuration such as the high traffic mode, which may include one or more of slowing down, increasing suction, implementing a desired movement pattern (e.g., a spot coverage mode wherein the autonomous vacuum cleaner 10 travels in a circle, spiral, zig-zag, back-and-forth, or other pattern, etc.), and other enhanced cleaning actions. In another embodiment, the autonomous vacuum cleaner 10 continues to operate in the first cleaning configuration in the high traffic area. While both steps 280 and 284 are identified in FIG. 9 as optional steps, it is contemplated that the process will either notify the user of the high traffic area 324 for further treatment at the user's discretion in step 280, or automatically take action in the high traffic area 324 such as operate the cleaner in the high traffic mode, dirty area mode, or other predetermined action in step 284. Alternatively, the process 200 can include a combination of both notifying the user in step 280 and automatically taking action in step 284 (e.g., if there is no user response after the notifying the user, etc.). In one embodiment, the process sends a notification of the high traffic area 324 to an external device, and receives instructions from the external device as to the action the autonomous vacuum cleaner 10 will take in the high traffic area 324. For one example, the external device can be a mobile phone, and the user can instruct the autonomous vacuum cleaner 10 through the mobile phone to use a particular action in the high traffic area 324 (e.g. increase suction, slow down speed, etc.) or take no special action in the high traffic area (e.g. continue in the first cleaning configuration, etc.).

At step 288, the controller 110 determines from the location of the autonomous vacuum cleaner 10 whether the autonomous vacuum cleaner 10 is still in the high traffic area 324. If the autonomous vacuum cleaner 10 is still in the high traffic area 324, or "yes" in step 288, the autonomous vacuum cleaner 10 continues to operate in its mode of operation in step 284. If the autonomous vacuum cleaner 10 is no longer in the high traffic area 324, or "no" in step 288, the process proceeds to step 292.

At step 292, if the autonomous vacuum cleaner is operating in the second cleaning configuration (e.g. the high traffic mode, etc.), the autonomous vacuum cleaner 10 returns to operate in its previous cleaning mode, such as the first cleaning configuration. The process then returns to step 208, where the process repeats as discussed above.

The autonomous vacuum cleaner 10 provides advantages over known autonomous vacuums in the art. By utilizing the dirt detection sensor 122, the autonomous vacuum cleaner 10 can detect and quantify dirt encountered by the autonomous vacuum cleaner 10. In addition, the control system 200 can utilize the information from the dirt detection sensor 122 to generate a map of the level of dirtiness of the area and identify possible high traffic areas in a high traffic map, and optionally implement a responsive cleaning configuration (or cleaning mode). The high traffic map can be used to operate the autonomous vacuum cleaner 10, with the appropriate cleaning mode being implemented based on the location of the autonomous vacuum cleaner 10 in the high traffic map and the associated level of dirtiness at the location in the high traffic map. In one embodiment, the control system 200 can further utilize the information from the dirt detection sensor 122 to quantify a relative amount of dirt encountered, associate an approximate location in an area, and generate a map of the level of dirtiness of the area. These and other advantages may be realized from one or more embodiments of the autonomous vacuum cleaner 10 disclosed herein.

What is claimed is:

1. An autonomous cleaner comprising:
   a chassis;
   a controller operably connected to a drive assembly and configured to move the chassis within an area to be cleaned in repeated cleaning cycles;
   a cleaning unit carried by the chassis, the controller being operably connected to the cleaning unit and configured to operate the cleaning unit in a first cleaning configuration and a second cleaning configuration;

a sensor configured to detect material drawn into the cleaning unit and provide a debris signal corresponding to an amount of material drawn into the cleaning unit, configured to generate a high-material indicator in response to the debris signal exceeding a predetermined debris threshold, and configured to communicate the high-material indicator to the controller; and an area sensing unit that is configured to map the area, the controller being operably connected to the area sensing unit and configured to determine the location of the autonomous cleaner in the area;

the controller having a memory and an electronic processor, the controller configured to store the location of the autonomous cleaner in the area where the high-material indicator was generated by the sensor in each of a predetermined number of cleaning cycles and generate a level of dirtiness map based upon the stored locations where the high-material indicator was received.

2. The autonomous cleaner of claim 1, the controller further configured to:

transmit to an external device the location of the autonomous cleaner where the high-material indicator was generated in each of a predetermined number of cleaning cycles.

3. The autonomous cleaner of claim 1, wherein in response to the controller receiving the high-material indicator from the sensor, the controller operates the cleaning unit in the second cleaning configuration.

4. The autonomous cleaner of claim 3, wherein the first cleaning configuration is different than the second cleaning configuration.

5. The autonomous cleaner of claim 3, wherein the cleaning unit includes a brush roll and a suction motor, and wherein the second cleaning configuration includes at least one selected from the group consisting of increasing a rotational speed of the brush roll, increasing a speed of the suction motor, reducing the speed of movement of the drive, and changing direction of movement into a pattern.

6. The autonomous cleaner of claim 3, wherein the cleaning unit includes a suction motor, and wherein the second cleaning configuration includes at least one selected from the group consisting of increasing a speed of the suction motor, reducing the speed of movement of the drive, and changing direction of movement into a pattern.

7. The autonomous cleaner of claim 3, wherein the controller operates in the second cleaning configuration until a predetermined time has elapsed since the high-material indicator was received by the controller.

8. The autonomous cleaner of claim 1, wherein the sensor includes a piezoelectric sensor or a microphone.

9. The autonomous cleaner of claim 1, wherein the controller operates the cleaning unit in the first cleaning configuration while no high-material indicator is received from the sensor.

10. A control system for an autonomous cleaner having a chassis, and a cleaning unit carried by the chassis, the control system comprising:

a controller having a memory and an electronic processor, the controller in electrical communication with a drive assembly and configured to cause movement of the chassis within an area to be cleaned in repeated cleaning cycles, and the controller in electrical communication with the cleaning unit and configured to cause the cleaning unit to operate in a first cleaning configuration and a second cleaning configuration;

a sensor configured to detect material drawn into the cleaning unit, provide a debris signal corresponding to an amount of material drawn into the cleaning unit, and communicate the debris signal to the controller; and an area sensing unit that is configured to map the area, the controller being in electrical communication with the area sensing unit, wherein the controller is configured to generate a map of the area, determine the location of the autonomous cleaner in the area, and store the location of the autonomous cleaner in the area where the debris signal was above a pre-determined threshold in each of a predetermined number of cleaning cycles and generate a level of dirtiness map based upon the stored locations where the high-material indicator was received.

11. The control system of claim 10, wherein the sensor is further configured to generate a high-material indicator in response to the debris signal exceeding a predetermined debris threshold, and to communicate the high-material indicator to the controller.

12. The control system of claim 11, wherein the controller is further configured to store the location of the autonomous cleaner on the map where the high-material indicator was received from the sensor in each of the predetermined cleaning cycles.

13. The control system of claim 11, wherein the controller is further configured to analyze the location of the autonomous cleaner where the high-material indicators were generated in each of the predetermined number of cleaning cycles;

identify a region having the high-material indicator in each of the predetermined number of cleaning cycles as a high traffic area;

determine whether the autonomous cleaner is in the high traffic area when the chassis moves within the area to be cleaned; and cause the cleaning unit to operate in a first cleaning configuration as the cleaning function in response to the controller determining that the autonomous cleaner is not in the high traffic area.

14. The control system of claim 11, wherein the controller is further configured to analyze the location of the autonomous cleaner where the high-material indicators were generated in each of the predetermined number of cleaning cycles;

identify a region having the high-material indicator in each of the predetermined number of cleaning cycles as a high traffic area;

determine whether the autonomous cleaner is in the high traffic area when the chassis moves within the area to be cleaned; and operate in a second cleaning configuration as the cleaning function in response to the controller determining that the autonomous cleaner is in the high traffic area.

15. The control system of claim 14, wherein the second cleaning configuration includes at least one selected from the group consisting of increasing a rotational speed of a brush roll, increasing a speed of a suction motor, reducing the speed of movement of a drive, and changing direction of movement into a pattern.

16. The control system of claim 10, wherein the second cleaning configuration includes at least one selected from the group consisting of increasing a speed of a suction motor, reducing the speed of movement of a drive, and changing direction of movement into a pattern.

17. The control system of claim 10, wherein the controller is further configured to transmit to an external device the location of the autonomous cleaner where the high-material indicator was generated in each of a predetermined number of cleaning cycles, and receive from the external device high traffic area attributes based on locations of high-material indicators.

18. The control system of claim 17, wherein the external device is configured to analyze the location of the autonomous cleaner where the high-material indicators were generated in each of the predetermined number of cleaning cycles, identify a region having high-material indicator in each of the predetermined number of cleaning cycles as a high traffic area, and determine high traffic area attributes based on locations of high-material indicators.

* * * * *